Dec. 28, 1965 B. H. PFAB 3,225,858
RADIO SYNCHRONIZED FIRING CONTROL
Filed Sept. 7, 1960 2 Sheets-Sheet 1

Fig. 1.

INVENTOR.
BENEDICT H. PFAB,
By Spensley & Horn
ATTORNEYS.

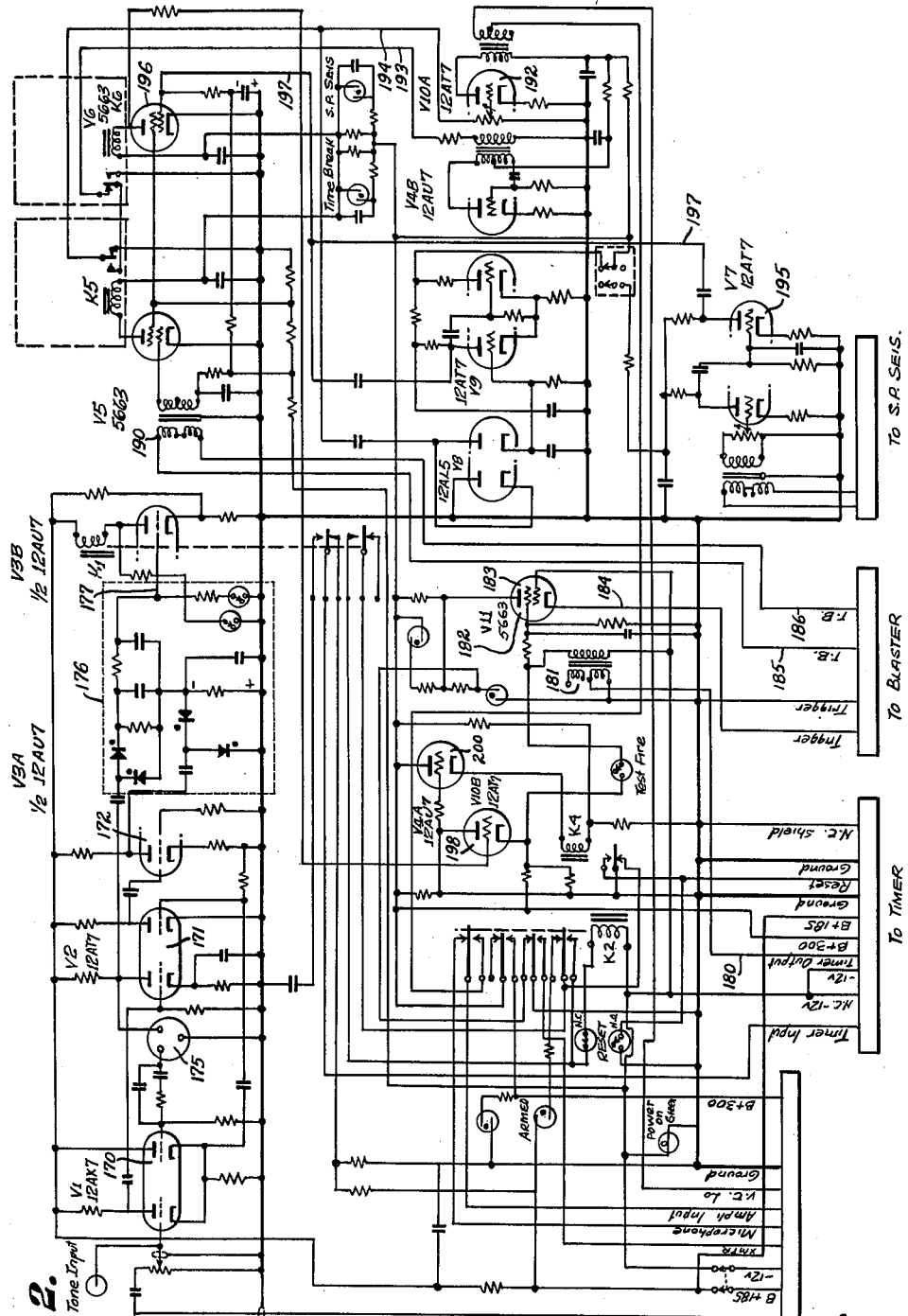

United States Patent Office 3,225,858
Patented Dec. 28, 1965

3,225,858
RADIO SYNCHRONIZED FIRING CONTROL
Benedict H. Pfab, Monrovia, Calif., assignor to Western Geophysical Company of America, Los Angeles, Calif., a corporation of Delaware
Filed Sept. 7, 1960, Ser. No. 54,505
8 Claims. (Cl. 181—.5)

This invention relates to seismographic exploration apparatus and more particularly to a method and apparatus for synchronizing the recording means of a seismographic exploration apparatus with the source of seismic disturbance.

In making seismographic surveys by the so-called reflection method, a record is made of the earth's disturbance produced at a given point on the earth's surface as a result of the detonation of an explosive charge placed on the earth's surface or at the surface of the earth at another point. In general, the record shows waves which have traversed paths close to the earth's surface and waves which have penetrated the earth and have been reflected by interfaces between two layers of different properties or characteristics. In many cases, several interfaces are present at varying depths and the record will show waves reflected from such interfaces. The amplitude of such reflected waves will vary over a considerable range depending upon a reflection coefficient associated with each interface.

The seismic disturbances initiated at a selected point on or adjacent the earth's surface and reflected seismic waves are detected at a plurality of points spread out in a selected pattern on the earth's surface. The seismic waves are detected by sensitive instruments which convert the seismic energy to electrical signals of comparable intensity. These electrical signals are amplified and recorded by various means known to the art such as a multi-channel recording apparatus. It is with such recordings that the present invention deals.

Most generally, the recording apparatus is a multi-channel tape recorder in which each of the detectors corresponds to one channel of the multi-channel seismograph record. This seismograph record is thus a time scale record of the intensity of transient signals, which are recorded in such a manner that the intensity of the signals received by the detectors is clearly discernible from the record and the record can be viewed as a meaningful whole. Various types of records are well known to the art as are various methods and means for forming such records. The present invention is applicable to all types of recordings, but will be described throughout the following discussion in connection with a multi-channel magnetic tape recording of the type in most general use.

Since the various transient signals recorded are dependent in meaning upon their relationship to the time of initiation of the seismic shock, it is essential that a time orientation or "time break" point be accurately established with respect to the time of the seismic disturbance. That is, more particularly in the illustrative application hereinafter, it is essential that the time break point on the magnetic record which is the zero time of the record, is accurately related to the time at which the explosive charge was fired to initiate the seismic shock.

The synchronization of the recording apparatus with the seismic shock is especially difficult to achieve in underwater seismic exploration. In exploring the earth under an ocean or a large body water, a first boat, hereinafter called the shot station, is utilized to position and fire the explosive charge which causes the seismic disturbance. A second boat, hereinafter termed the recording station, carries the recording equipment including the multi-channel recorder to which the various signals from the spread detectors are fed for recordation in the multi-channel record. Since the shock station and recording station are spaced apart by a considerable distance, it is essential that a method and apparatus be utilized to accurately synchronize the time of firing of the shot at the shot station with the time of recording at the recording station. Radio communication is most generally utilized, however, prior to the present invention certain difficulties were encountered in connection with the radio communication system. Two radio frequencies have been utilized in the prior art, the first frequency channel being used for radio communication between the shot station and recording station, the second frequency channel being used as a radio synchronization channel. In compliance with regulations of government agencies concerned with radio communication, it has become necessary to avoid the use of two frequency channels when using radio synchronization of seismic recording events.

Accordingly, it is a primary object of the present invention to provide a method and apparatus for synchronizing the recording means of a seismographic exploration apparatus with the source of seismic disturbance by utilizing a single channel for radio synchronization and communication between a spaced apart recording station and shot station.

It is another object of the present invention to provide an improved radio synchronization method and apparatus for synchronizing the recording means of a seismographic recording apparatus with the source of seismic disturbance which is applicable to various methods and apparatus for recording.

A further object of the present invention is to provide such a synchronizing method and apparatus which is efficient and automatic in use.

Yet another object of the present invention is to provide a seismic exploration apparatus which synchronizes a sequence of events in predetermined spaced time relationship, different events in the sequence being triggered or actuated by radio signals transmitted on the normally used communications frequency.

The novel features which are believed to be characteristic of the present invention, both as to its method of operation and apparatus, together with further objects and advantages thereof, will be better understood from the following description considered in connection with the accompanying drawings in which a presently preferred embodiment of the invention is illustrated by way of example. It is to be expressly understood, however, that the description is for the purpose of illustration only and that the true spirit and scope of the invention is to be defined by the accompanying claims.

In the drawings:

FIGURE 1 is a schematic diagram of the recording station control apparatus; and

FIGURE 2 is a schematic diagram of the shot station control apparatus.

In general terms the presently preferred method and apparatus of the present invention is adapted to a multi-channel magnetic recording apparatus of the well-known type wherein a magnetic recording tape is carried by a tape transport drum beneath a plurality of magnetic recording heads corresponding to the plurality of channels on the recording tape. In the embodiment described two revolutions of the tape transport drum are utilized for each recording of a synchronized shot. It will be apparent in view of the description hereinafter that the method and apparatus of the present invention are equally applicable to a system in which one revolution of the tape transport drum is utilized for each synchronized shot. As previously described, the method and apparatus of the present invention is particularly applicable to underwater exploration and the various components of the apparatus are located at the shot station, which is a first boat, and the recording station, which is a second boat. The means for causing the seismic disturbance, i.e., an explosive charge, and the position at which it is detonated with respect to the water surface are well known and form no part of the present invention. Similarly, the detectors which detect the reflected seismic disturbances and convert the seismic energy to electrical energy which is recorded at the corresponding recording head are well known as is the method of positioning and spacing such detectors.

The objects of the present invention are accomplished by providing a sequence of events in predetermined spaced time relationship, different events in the sequence being triggered by radio signals transmitted on the normally used communications frequency. The desired sequence of events is as follows:

(a) Starting with the shot station radio equipment in the "receive" condition and the recording station radio equipment in the "transmit" condition, the multi-channel seismic recorder tape transport mechanism is activated to begin movement of the recording tape past the recording heads, the recording mechanism still being inactive;

(b) the shot station radio equipment is changed from the "receive" to the "transmit" condition and the recording station radio equipment from the "transmit" to the "receive" condition;

(c) the recording mechanism is actuated;

(d) the shot is fired and a "time break" pulse is transmitted by the shot station radio equipment, received by the recording station radio equipment and impressed on a channel of the recording apparatus to provide a desired time reference point; and (e) after a predetermined operating time the recorder mechanism is inactivated and the apparatus automatically reset for another shot.

The presently preferred arrangement of electronic apparatus to cause this sequence of events consists, in addition to the recording apparatus and radio communication equipment, of five interconnected electronic assemblies designated as the recording station control, the tape control box, the shot station control, the shot station timer, and the synchronized blaster. The recording station control and the tape control box are located at the recording station while the shooting station control, the shot station timer and the synchronized blaster are located at the shot station. The radio communication equipment at each of the stations includes both transmitting means and receiving means, which may be separate units or may be combined in one unit as a so-called transceiver. Therefore, the terms "transmitting means" and "receiving means," as utilized herein, is intended to include transceivers as well as separate transmitting and receiving units.

Referring now to FIGURE 1, there is shown a schematic diagram of the recording station control unit. Since the electronic circuitry utilized in the apparatus of FIGURES 1 and 2 is well known to those skilled in the art, the various parts of the circuitry will be discussed chiefly with respect to the particular functions they perform, it being understood that various other well-known circuitry can be substituted to perform the same functions. The desired sequence of events is manually initiated at the recording station by depression of a "fire button" located on the panel of the recording station control unit. Depression of the fire button 99 actuates a control relay K1 which in turn causes actuation of the recorder tape transport mechanism (not shown) through the "drum start" switching circuitry (vacuum tube V6B numbered 100 and relay K2), by providing a closing of the circuit to ground at 198 of the cathode 104 of the vacuum tube 100 to relay K2 over lead 101. This occurs when the movable contact 102 associated with relay K1 switches upon depression of fire switch 99. This turns on the recording station radio transmitter (not shown), which is connected to lead 105 in FIGURE 1, and connects the output of a warning tone oscillator (V3A–3B), which is a 12AU6 vacuum tube numbered 106, to the microphone input 107 of the transmitter to cause transmission of a distinctive tone signal to warn personnel at the shot station that the firing sequence has been initiated. (Relay K1 is locked-in through its own contact 108 of relay K1 and contact 109 of relay K4 and through the contacts of unactivated relay K4. Hence, the fire button 99 can be released without interruption of the firing sequence.) A micro-switch (not shown), but connected at 110 is mounted adjacent the drum of the tape transport mechanism to be actuated by a cam thereon. The cam and micro-switch being sufficiently spaced, when the drum is at the starting position, that the drum has reached its synchronous speed when the cam actuates the micro-switch. Actuation of the micro-switch causes thyratron V4 numbered 111 to be fired. This occurs as a pulse will be present at lead 112 when the drum switch closes which pulse appears at the grid 113 of tube 111 through transformer 114. The firing of thyratron V4 causes actuation of relay K3 by a pulse over lead 113 to switch the modulation input of the recording station transmitter from the output of the warning tone oscillator 106 over lead 117 to the output of timing tone oscillator tubes 119 and 120 (V1, V2A–V2B) over lead 117 to thereby cause transmission of timing tone to start operation of a preset timer at the shot station. This timing tone signal from the oscillator 119 and 120 comes over lead 117 through movable contact 121 of relay K3 through transfer 122, over lead 123, and through fixed contact 124 of relay K1 (it is still energized) over lead 125 which is connected to lead 107. The frequency of the timing tone oscillator is different from the frequency of the warning tone oscillator and the modulating signal it provides is limited to the fundamental tone by a selective network 126 so that the preset timer (not shown) will not be unintentionally actuated by extraneous signals or noise.

Shortly after closing of the drum switch a "xmtr. off" tube V6A numbered 128 begins conducting to actuate relay K4, thereby removing the lock-in voltage from relay K1 and deenergizing it to turn off. This occurs as movable contact 109 associated with relay K4 is connected to ground through lead 129 as it is connected to movable contact 108 of relay K1. Thus the recording station radio transmitter not shown and connected to lead 105 is turned off and return the radio equipment at that station to the receive position. Shortly thereafter, a "time break gate" tube V7A numbered 130 begins to conduct as when relay K1 is energized, holding contact 108 which is connected to ground through lead 129 and relay K4 thus removing fixed contact 131 associated with relay K4 from ground. Thus this removes lead 133 from ground which is connected to the grid of tubes 100, 128 and 130. As the grid of tube 130 is removed from ground it is connected through resistor 134 and capacitor 135 which act together as a charging network to thus establish a slight positive voltage of the grid of tube 130 over lead 133, thereby energizing relay K5. (The tubes V6A 128 and V7A 130 are adjusted to begin conducting at predetermined times after actuation of relay K1 by adjustment of potentiometers in their respective cathode circuits, the times being after deactivation of relay K1 but before the shot is fired.) Energization of the relay K5 removes a short circuit to ground 98 over lead 138 from the input circuit of a time break diode tube V8 numbered 138 and connects the output of the radio receiver (not shown) but connected at lead 140 to the input circuit including transformer 140 of the tube V8 numbered 137. Immediately before the end of the preset time interval the tape recording mechanism (not shown) is energized by a mechanically actuated relay in the tape control box (not shown). (The preset timing interval is adjusted for completion approximately 150 milliseconds after energization of the tape recording mechanism.) At the end of the preset time interval the shot is fired and at the instant of firing the shot station transmits a short "time break" signal pulse in a manner to be hereinafter described. The time break pulse is received by the recording station radio and passed to tube V8 from lead 140 which is connected to fixed contact 141 associated with relay K5 where it is rectified, the resulting D.C. voltage being applied to override the bias on tubes V9A–B and V10A–B, thereby allowing these tubes to conduct for the duration of the time break pulse and provide three time break outputs for camera display. This occurs as a signal over lead 138 is presented to rectifier 137 whose output at lead 145 is connected to each of the tubes (V9A–B and V10–B) numbered 146 and 147. Tubes 146 and 147 are normally biased to cut off but upon receipt of the signal from rectifier 137 they begin to conduct momentarily (from the time of the pulse from the rectifier). Upon conduction of tubes 146 and 147, their cathodes 150, 151 and 152 and 153 result in pulses which are time break pulses. In addition, a special tape time break is provided by the circuitry associated with tubes V10B and V11A to provide a predetermined wave shape. Upon completion of the time break pulses at leads 150 through 153 the tube V5, thyratron 160 is triggered to cause actuation of relays K6 and K7 to thereby open the time break output connections 160, 161, 162 to the camera. The actuation of relay K6 also causes the delayed actuation of a "reset" tube V7B numbered 143 and its associated relay K9 to subsequently turn off the recording apparatus and reset the electronic devices in preparation for another shot.

Referring now to FIGURE 2 and the schematic diagram of the shot station control, there is shown a dual amplifier channel including vacuum tubes V1, V2 and V3 numbered 170, 171 and 172. The amplifier input is connected across the voice coil (not shown) over lead 173 of the shot station radio receiver (not shown) and radio signals are thereby fed into both channels of the dual amplifier. One channel has a wide pass band while the other channel has a narrow pass band restricted by a selective network 175 having the same characteristics as the selective network 126 in FIGURE 1 in the recording station timing tone oscillator. Hence, one amplifier channel will pass all received signals while the other channel will pass only signals modulated at the timing tone frequency. The outputs of both amplifier channels are combined in combining network 176 in such a manner that a resultant output signal at grid 177 will be present only if a signal modulated at the timing tone frequency is present in such strength as to override all other received signals, thereby making it relatively certain that only the proper timing signal will produce a resultant amplifier output. A resultant output signal, i.e., the timing tone signal, fed to tube V3B at grid 177 and actuates relay K1 to start the preset timer and to cause the actuation of relay K2. Actuation of relay K2 switches the shot station radio equipment to the transmit position, and connects the output of a time break amplifier tube V10A to the amplifier input of the radio transmitter. The relay K2 is locked-in through the contacts of unenergized relay K4, thereby keeping the transmitter on after the timing tone signal is completed.

Upon completion of the preset timing interval a trigger pulse is sent from the timer (not shown) over lead 180 through transformer 181 to grid 182 of tube 183 to actuate tube V11, 183 to thereby actuate the synchronized blaster (not shown) over lead 184 and fire the shot, in a manner to be hereinafter described. Firing of the shot causes a time break pulse to be sent from the synchronized blaster to tube V5 over leads 185 and 186 to actuate a time break relay K5 through transformer 190 and cause the output from an oscillator circuit utilizing tube V4B numbered 191 to be fed to the time break amplifier tube V10A, numbered 192 through lead 193 and hence to cause transmission of a time break pulse at lead 194 to give the recording station the desired time reference point. The length of the time break pulse is very short, on the order of 20 milliseconds, and can be determined in either one of two ways. It can be determined by the length of a pulse generated by multivibrator tube V9, triggered by diode V8, or it can be determined by the shot point seismometer through an amplifier tube V7 195 to thereby provide a measure of the up-hole time. Cut off of the time break pulse is achieved by the triggering of tube V6 numbered 196 over lead 197 and consequent actuation of relay K6, the trigger voltage coming either from the shot point seismometer through V7, 195 or from the multivibrator tube V9, 191. The conduction of tube V6, 196 also causes operation of a clamping tube V10B which is the other half of V10B and is numbered 198 and later operation of a switching tube V4A numbered 200 to actuate relay K4 over lead 201 to turn off the radio transmitter by deenergizing relay K2 as ground is removed from bottom contact 202 associated with relay K4 and thereby automatically resetting the apparatus for another shot. The circuit constants are adjusted so that relay K4 will be energized approximately 12 seconds after energization of relay K6.

The preset timer, not shown, utilizes well-known electronic circuitry to provide an adjustable pretedermined timing period accurate to at least one millisecond and operates in the manner hereinafter described.

The synchronized blaster, not shown, is of the flash discharge type and is adapted to provide an electrical output pulse at the instant of firing. The tape control box, not shown, interconnects the tape recorder with the recording station control and an automatic camera, when utilized, and functions to control the operation of the tape recorder drum and recording heads by means of cam actuated switches in accordance with the desired periods of operation. Utilization of the above described embodiment of apparatus will result in the preferred sequence of events as follows:

(a) When the fire button on the recording station control is pressed, the recording station transmitter is turned on, the tape recorder drum turned on, and a warning tone transmitted to the personnel at the shot station.

(b) After the tape recorder drum reaches synchronous speed, a timing tone signal is transmitted by the recording station radio transmitter, after which the recording station radio equipment is transferred from the transmit to the receive condition.

(c) Upon receipt of the timing tone signal by the shot station radio equipment a preset timer at the shot station is actuated and the shot station radio equipment is transferred from the receive to the transmit condition.

(d) Immediately prior to completion of the preset timing interval the recording mechanism is actuated;

(e) Upon completion of the preset timing interval the shot is fired and a time break pulse transmitted by the shot station to provide the desired time reference point.

(f) After a predetermined operating time the recorder mechanism is inactivated and the apparatus automatically reset for another shot.

What is claimed is:

1. In a geophysical exploration apparatus wherein a seismic shock is initiated at a shot station and disturbances caused thereby are recorded at a recording station remote from said shot station, apparatus for synchronizing the operation of a recording means and the source of seismic disturbance, said synchronizing apparatus comprising: first radio transmitting means positioned at said recording station for transmission of radio signals at a predetermined frequency; first radio receiving means positioned at said recording station for receiving radio signals at said predetermined frequency; second radio transmitting means positioned at said shot station for transmitting radio signals at said predetermined frequency; second radio receiving means positioned at said shot station for receiving radio signals at said predetermined frequency; selectively actuable means positioned at said shot station for initiation of a seismic shock; a warning tone oscillator for modulating radio signals transmitted by said first transmitting means with a predetermined audio warning signal; a timing tone oscillator for modulating radio signals transmitted by said first transmitting means with a predetermined timing signal; first control means for selectively sequentially coupling said warning tone oscillator and said timing tone oscillator to said first radio transmitting means; and second control means coupled to said shock initiating means and to said second radio receiving means for automatically actuating said shock initiating means in response to reception of said predetermined timing signal by said second radio receiving means.

2. In a geophysical exploration apparatus wherein a seismic shock is initiated at a shot station and disturbances caused thereby are recorded at a recording station remote from said shot station, apparatus for synchronizing the operation of a recording means and the source of seismic disturbance, said synchronizing apparatus comprising: first radio transmitting means positioned at said recording station for transmission of radio signals at a predetermined frequency; first radio receiving means positioned at said recording station for receiving radio signals at said predetermined frequency; second radio transmitting means positioned at said shot station for transmitting radio signals at said predetermined frequency; second radio receiving means positioned at said shot station for receiving radio signals at said predetermined frequency; selectively actuable means positioned at said shot station for initiation of a seismic shock; a warning tone oscillator for modulating radio signals transmitted by said first transmitting means with a predetermined audio warning signal; a timing tone oscillator for modulating radio signals transmitted by said first transmitting means with a predetermined timing signal; first control means for selectively sequentially coupling said warning tone oscillator and said timing tone oscillator to said first radio transmitting means; selectively actuable timing means positioned at said shot station for establishing a predetermined time interval; and, second control means coupled to said shock initiating means and to said timing means and to said second radio receiving means, said second control means including selective circuit means responsive to said timing signal for selectively actuating said timing means upon reception of said timing signal and for subsequently automatically actuating said shock initiating means.

3. In a geophysical exploration apparatus wherein a seismic shock is initiated at a shot station and disturbances caused thereby are recorded at a recording station remote from said shot station, apparatus for synchronizing the operation of a recording means and the source of seismic disturbance, said synchronizing apparatus comprising: first radio transmitting means positioned at said recording station for transmission of radio signals at a predetermined frequency; first radio receiving means positioned at said recording station for receiving radio signals at said predetermined frequency; second radio transmitting means positioned at said shot station for transmitting radio signals at said predetermined frequency; second radio receiving means positioned at said shot station for receiving radio signals at said predetermined frequency; selectively actuable means positioned at said shot station for initiation of a seismic shock; a tape recording apparatus positioned at said recording station, said tape recording apparatus including a recording head for magnetically impressing electrical signals upon said recording tape and a tape transport mechanism for passing said recording tape through the magnetic circuit of said recording head; tape control means for selectively energizing said tape transport mechanism and for subsequently automatically energizing said recording head; manually actuable first control means coupled between said tape control means and said first radio transmitting means, said first control means including a timing tone oscillator and first and second automatically sequentially actuable relays, actuation of a first relay energizing said tape control means and subsequent actuation of a second relay coupling the output of said timing tone oscillator to the modulation circuit of said first radio transmitting means for selectively modulating radio signals transmitted by said first transmitting means with a predetermined timing signal for a predetermined time interval; and second control means coupled to said shock initiating means and to said second radio receiving means for automatically actuating said shock initiating means in response to reception of said predetermined timing signal by said second radio receiving means.

4. In a seismic exploration method wherein a seismic disturbance is created by apparatus positioned at a shot station and the disturbance recorded by apparatus positioned at a remote recording station, both the shot station apparatus and the recording station apparatus including radio transmitting means and receiving means for communication therebetween on a predetermined frequency channel, the sequence of events in spaced time relationship comprising:

initiating said sequence of events by operating the radio transmitting and receiving means at said recording station for a first predetermined time interval;

transmitting from the recording station to the shot station on the predetermined frequency channel a radio timing tone signal at completion of said first predetermined time interval;

in response to said timing tone signal at the termination of said first time interval automatically converting said shot station apparatus to the transmit condition and said recording station apparatus to the receive condition;

initiating a second predetermined time interval;

actuating said recording apparatus during second time interval;

initiating the seismic disturbance at the end of said second time interval and transmitting a time-break pulse from said shot station to said recording station on said predetermined radio frequency; and recording seismic intelligence signals during a third predetermined time interval.

5. In a seismic exploration method wherein a seismic disturbance is created by apparatus positioned at a shot station and the disturbance recorded by apparatus positioned at a remote recording station, both the shot station apparatus and the recording station apparatus including radio transmitting means and receiving means for communication therebetween on a predetermined frequency channel, the sequence of events in spaced time relationship comprising:

transmitting a predetermined radio warning signal of one oscillation frequency from said recording station to said shot station on the predetermined radio frequency channel for a first predetermined time interval;

transmitting from said recording station to the shot station on said predetermined frequency channel a radio timing tone signal at completion of said first predetermined time interval;

in response to said timing tone signal at the termination of said first time interval automatically converting said shot station apparatus to the transmit condition and said recording station apparatus to the receive condition;

initiating a second predetermined time interval;

actuating said recording apparatus during second time interval;

initiating the seismic disturbance at the end of said second time interval and transmitting a time-break pulse from said shot station to said recording station on said predetermined radio frequency; and, recording seismic intelligence signals during a third predetermined time interval.

6. Single-frequency radio synchronizing means for seismograph prospecting comprising in combination:
   first radio transmission and receiving means tuned to a predetermined frequency at a first location;
   first timing means controlling said first radio transmission and receiving means;
   a tone generator means at said first location for transmission of a timing tone signal by said first radio means;
   second radio transmission and receiving means tuned to said predetermined frequency at a second location remote from said first location;
   tone detection means at said second location;
   second timing means at said second location responsive to transmission of said timing tone emitted by said first transmission and receiving means and received by said tone detection means at said second transmission and receiving means, said second timing means also controlling the time sequence of transmissions of said second transmitting and receiving means; and,
   recording means at said first location controlled by said first timing means.

7. Single-frequency radio synchronizing means for seismograph prospecting comprising in combination:
   first radio transmission and receiving means tuned to a predetermined frequency at a first location;
   first timing means measuring a first predetermined time interval and controlling said first radio transmission and receiving means, a timing tone generator means at said first location for transmission of a timing tone signal by said first radio means at completion of said first predetermined time interval;
   second radio transmission and receiving means tuned to said predetermined frequency at a second location remote from said first location;
   timing tone detection means at said second location;
   second timing means at said second location measuring a second predetermined time interval and responsive to and initiated by transmission of said timing tone emitted by said first transmission and receiving means and received by said tone detection means at said second transmission and receiving means, said second timing means also controlling the time sequence of transmissions of said second transmitting and receiving means;
   trigger pulse generating means responsive to completion of said second predetermined time interval, synchronized blaster means at said second location responsive to said trigger pulse to initiate a seismic shot and transmit a time-break pulse indicative thereof from said second radio means to said first radio means; and,
   recording means at said first location controlled by said first timing means.

8. Single-frequency radio synchronizing means for seismograph prospecting comprising in combination:
   first radio transmission and receiving means tuned to a predetermined frequency at a first location;
   first timing means measuring a first predetermined time interval controlling said first radio transmission and receiving means, warning tone generator means of first oscillation frequency at said first radio means for transmitting a warning tone upon actuation of the first radio means and during said first predetermined time interval, a timing tone generator means of second oscillation frequency at said first location for transmission of a timing tone signal by said first radio means at completion of said first predetermined time interval;
   second radio transmission and receiving means tuned to said predetermined frequency at a second location remote from said first location;
   timing tone detection means at said second location;
   second timing means at said second location measuring a second predetermined time interval and responsive to and initiated by transmission of said timing tone emitted by said first transmission and receiving means and received by said tone detection means at said second transmission and receiving means, said second timing means also controlling the time sequence of transmissions of said second transmitting and receiving means;
   trigger pulse generating means responsive to completion of said second predetermined time interval, synchronized blaster means at said second location responsive to said trigger pulse to initiate a seismic shot and transmit a time-break pulse indicative thereof from said second radio means to said first radio means; and,
   recording means at said first location controlled by said first timing means.

References Cited by the Examiner

UNITED STATES PATENTS

| | | | |
|---|---|---|---|
| 2,479,772 | 8/1949 | Peterson | 181—.5 X |
| 2,640,187 | 5/1953 | Hasbrook | 181—.5 |
| 2,700,753 | 1/1955 | Peterson | 181—.5 |
| 2,707,524 | 5/1955 | Montgomery | 181—.5 |
| 2,926,739 | 3/1960 | Shoemaker | 181—.5 |
| 3,062,315 | 11/1962 | Herzog | 181—.5 |

SAMUEL FEINBERG, *Primary Examiner.*

LAURENCE V. EFNER, CHESTER L. JUSTUS, BENJAMIN A. BORCHELT, *Examiners.*